June 5, 1928.

W. A. KOSKEN 1,672,222

MOTION PICTURE MACHINE

Filed May 31, 1924

INVENTOR
Wilho A Kosken
BY Jas. H. Griffin
ATTORNEY

June 5, 1928.

W. A. KOSKEN

MOTION PICTURE MACHINE

Filed May 31, 1924

INVENTOR.
Wilho A. Kosken
BY Jas. H. Griffin
ATTORNEYS.

June 5, 1928.
W. A. KOSKEN
MOTION PICTURE MACHINE
Filed May 31, 1924
6 Sheets-Sheet 4
1,672,222
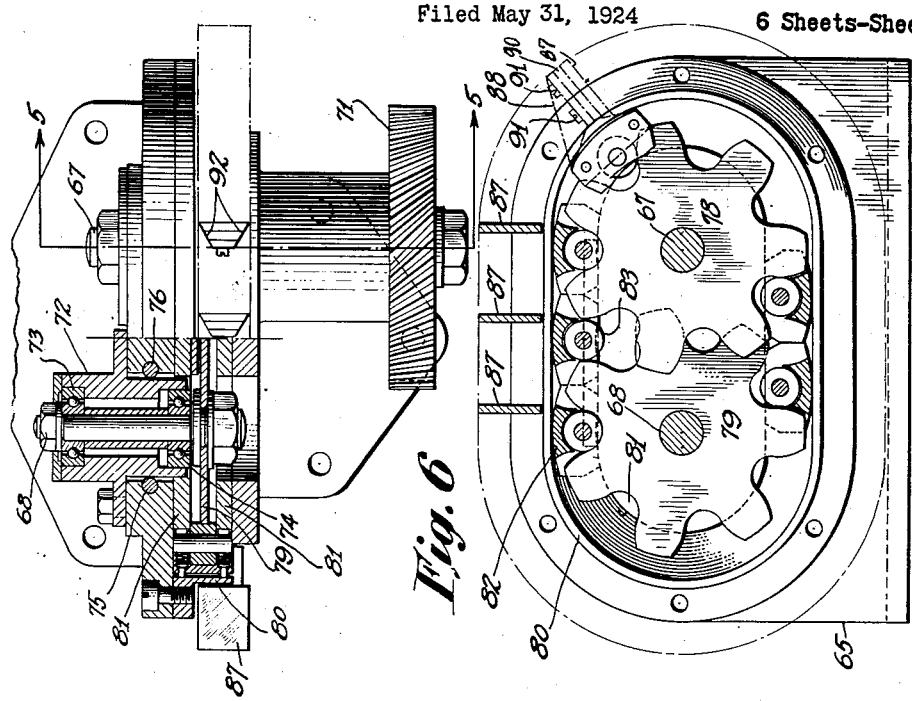
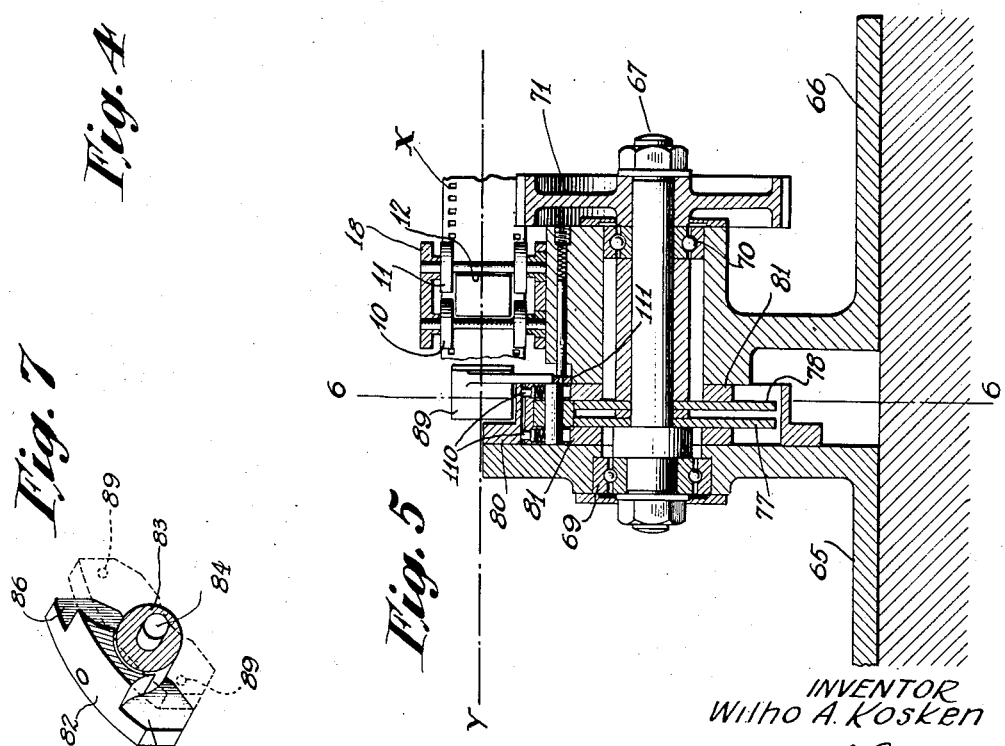
INVENTOR
Wilho A. Kosken
BY Jas. H. Griffin
ATTORNEY June 5, 1928.
W. A. KOSKEN
MOTION PICTURE MACHINE
Filed May 31, 1924
1,672,222
6 Sheets-Sheet 5
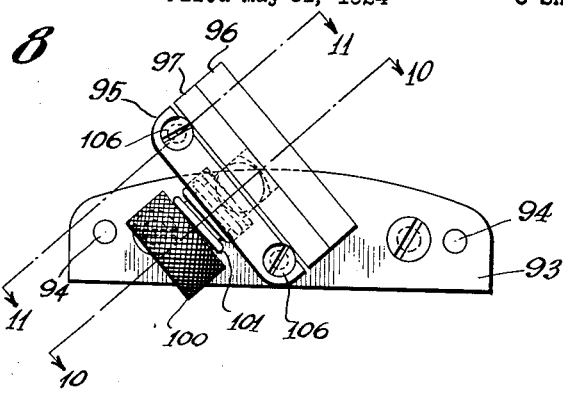
Fig. 8
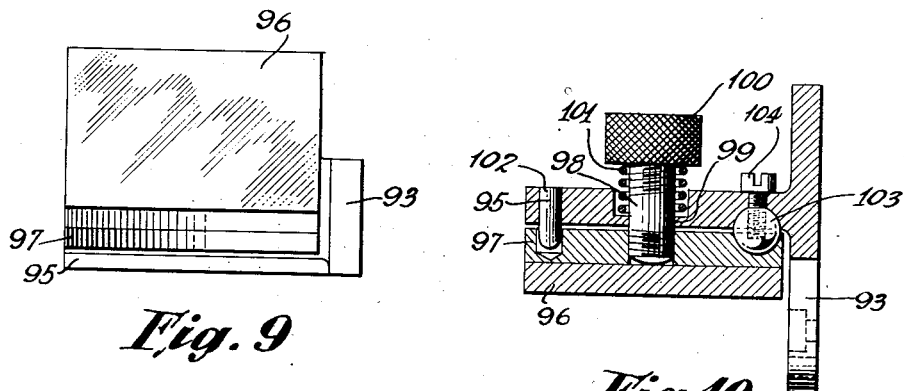
Fig. 9
Fig. 10
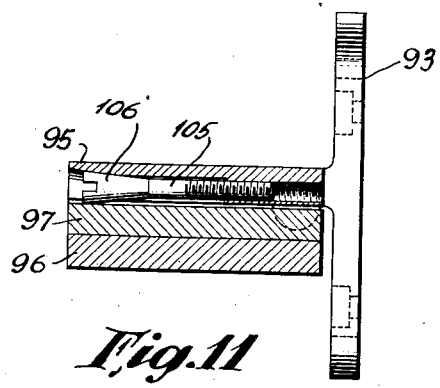
Fig. 11
INVENTOR
Wilho H. Kosken
BY Jas. H. Griffin
ATTORNEY June 5, 1928.
W. A. KOSKEN
MOTION PICTURE MACHINE
Filed May 31, 1924
1,672,222
6 Sheets-Sheet 6
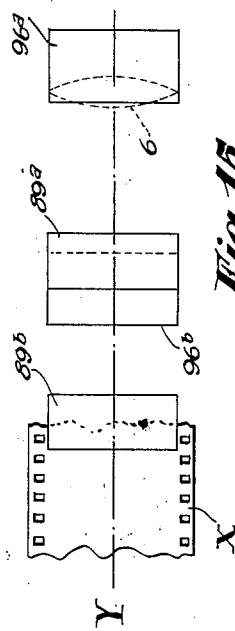
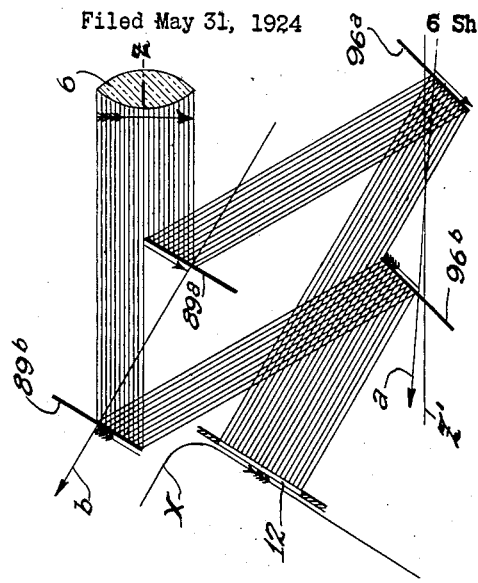
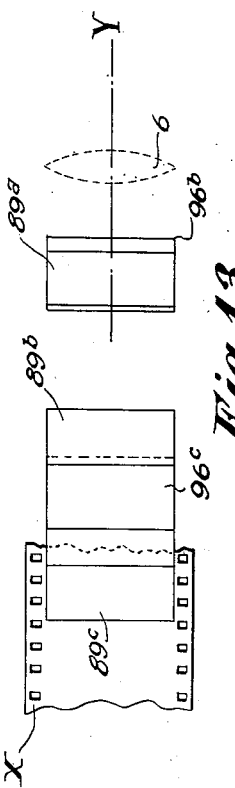
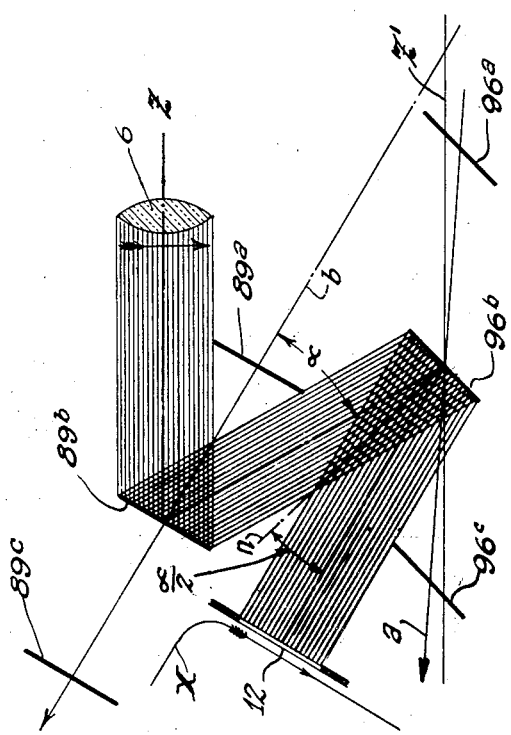
INVENTOR
Wilho A. Kosken
BY Jas. H. Griffin
ATTORNEY Patented June 5, 1928.

1,672,222

UNITED STATES PATENT OFFICE.

WILHO A. KOSKEN, OF NEW YORK, N. Y., ASSIGNOR TO STEADYLITE MOTION PICTURE MACHINE CORPORATION, OF NEW YORK, N. Y., A CORPORATION OF NEW YORK.

MOTION-PICTURE MACHINE.

Application filed May 31, 1924. Serial No. 716,867.

This invention is a motion picture machine adapted to be employed both as a camera and projector though especially intended for the latter purpose.

More specifically stated, the invention is directed to an optical machine for the taking or projection of motion pictures without the employment of a shutter. That is to say, a machine where the film to be exposed or projected is moved continuously in contradistinction to intermittent movement with alternate operations of a shutter. Motion picture machines as now generally employed utilize an intermittent movement of the film with alternate periods of rest or dwell, the shutter being operated during periods of movement of the film so that exposure or projection is accomplished only during periods of rest.

In the camera or projector of this invention, however, the film moves continuously and preferably at a uniform speed and the successive pictures are passed between the film and the objective through cooperating series of moving deflectors which bend the light beams passing from the film to the objective or vice versa in such manner as to effect proper exposure of the film or proper projection of the developed film. The broad advantage of this type of machine, when properly organized and coordinated is that picture projection may be carried on without the detrimental flicker inherent in practically all machines employing shutters. It is this flicker which produces eyestrain which affects an audience even though it may be unconscious of it and which, in many instances, is so pronounced that many people with relatively weak optic nerves cannot view picture projection for any appreciable length of time without detrimental effect on the optic nerves.

It is essential in the proper projection of pictures to maintain through successive exposures a constant focal length of the projected picture. In the machines employing shutters and where the light is passed directly through the film and through the objective, as is the common practice, the focal length is naturally maintained. However, when the shutter is eliminated and the projected pictures successively and continuously brought into registration on the screen, the utilization of cooperating deflectors enters the problem of maintaining constant focal length and, unless the parts are so organized that this length is constant, the machine cannot properly function.

Attempts have heretofore been made to project pictures from a constantly moving film through objective lenses by the interposition of two cooperating series or sets of moving deflectors and in every instance the deflectors have been so mounted and operated that the angle of incidence of the light beam passing from the film to the objective has been at a forty-five degree angle. This is the natural relationship which one might be expected to employ since the focal length may be kept constant by this arrangement. It is however found that when this relationship of a forty-five degree angle of incidence and reflection is employed certain mechanical, as well as optical obstacles are met with, which preclude the satisfactory performance of a machine so constituted. Among the most important of these obstacles is the fact that it is a practical impossibility to utilize a standard motion picture film such as is now used in shutter machines, wherein the pictures or successive exposures are directly adjacent one another in sequence, i. e. not interspaced. In other words, experience has proven that if moving deflectors are to be utilized for bending a beam during its passage from the film to the objective with the deflectors so set that the angle of incidence and angle of reflection with respect to the deflectors is 45 degress that the utilization of the well known standard motion picture film is impossible and that special films intended for use in particular machines of the character specified must be employed.

The art is replete with suggested constructions for the employment of the forty-five degree angle of incidence and deflection in the projection of pictures through the utilization of two cooperating series of moving deflectors, but practical endeavor and experience has conclusively shown that while this angular degree may give uniform or constant focal length, it cannot be utilized in conjunction with the projection of pictures from a standard film. In every instance, special films are required which must be exposed in cameras operating in the same manner as the projectors with which the films are to be projected and this fact has formed an unsurmountable barrier to the commercializing of machines of the character specified.

With these considerations in mind, I have been engaged in extensive experimentation and research for the purpose of producing a machine for projecting a continuously moving film and utilizing as such a film a standard construction now commonly employed in conjunction with the well known shutter machines. This type of film is now used to the exclusion of all others and by producing such a machine, I am enabled to obtain satisfactory and highly efficient projection from such standard film and without requiring special film construction.

So far as I am aware, I am the first to successfully accomplish this result.

In practically carrying out the invention, I interpose between the film and the objective two series of movable deflectors. While more than two series may be employed, two are preferably used as the most economical construction thereby results and the best optical effects are thereby obtained. The underlying principle of this invention in its broadest aspect consists in so mounting and placing said deflectors that they will intercept the light beam at such angles and in such relation to one another that the angle of incidence and reflection of one series will be twice the angle of incidence and reflection of the other series or vice versa.

Exhaustive experimentation and practical demonstration have convinced me that a machine for successfully projecting motion pictures, while employing a continuously-moving standard film and eliminating the shutter, can only be produced by following this ratio between the angle of incidence and reflection of one series and the angle of incidence and reflection of the other series.

Attempts at variation from this discovery have resulted in failure to obtain proper projection, whereas a strict adherence to this discovery, which I may refer to as the law of this invention, has invariably produced satisfactory results due mainly to the fact that the focal length is accurately maintained. A standard motion picture film may be used in such a machine and the necessity of special films is wholly obviated. Moreover, machines embodying this discovery may be economically commercially produced through the employment of relatively simple trains of mechanism operating upon elementary optical principles.

Mechanism based on this discovery may vary in mechanical details and in general arrangement, but in the specific type of machine illustrated in the accompanying drawings a particular arrangement of the parts is contemplated which permits of remarkable compactness and simplicity of construction.

In this which constitutes the preferred embodiment of the invention, the film is mounted to operate with its medial line at the point of exposure in a plane including the principal axis of the objective lens and the deflectors of which there are two series operable severally along continuous paths so located that as the deflectors of each series approach, pass through and recede from the zones of reflection, their medial lines are travelling in this common plane. In other words, said deflectors, so long as they are in effective relation to the light beam, move in a common plane with respect to one another and this common plane includes the major axis of the objective lens and the medial line of the film image which is being projected.

An important part of my discovery resides in the fact that the two to one ratio between the angles of incidence and reflection of one series and those of the other series of deflectors not only permit the employment of a standard motion picture film in a machine, but also allow of the employment of a fixed objective lens in contradistinction to the movable objective lens and lens systems which have heretofore been utilized in an attempt to counteract or overcome the disadvantages of the forty-five degree angle hereinbefore referred to. The present machine therefore embodies a fixed lens, uses a standard film and the operative parts entering into the projection or exposure of the film function during these operations in a comon plane.

An important feature of the present invention from a practical standpoint is inherent in the fact that the film is operated continuously and preferably at a substantially uniform speed in contradistinction to the step by step or intermittent movement of the shutter machines now in common use. By running the film continuously, it is not subjected to the tearing strains incident to sudden stopping and starting and the tendency of the machine to damage the film is thus minimized. Moreover, in view of the fact that the wear and tear on the film is practically negligible, the film may be passed through the machine of this invention at much higher speeds than are practical in machines having the intermittent movement with consequent obvious advantages.

Aside from these broad aspects of the invention, the invention includes many novel features of the construction adapted to expedite and facilitate the manufacture of the machine and its subsequent operation. Among these features may be mentioned the employment of novel mechanism for controlling operation of the machine, as well as regulating the speed of such operation which of course includes the regulation of the linear speed of the film and a simultaneous synchronizing of the cooperating parts of the apparatus which enter into the exposing or projection of the film. This mechanism enables the operator to efficiently control the starting or stopping of the machine and simultaneously and with equal ease regulate the speed of such operation, so that the film may be caused to run faster or slower as may be desired.

It is to be noted that when the angular relationship between the angles of incidence and reflection of the two series are two to one, as specified, and the parts so associated with the film and the deflectors of each of the two series travel all in different directions, as they do in the machine of this invention, all of these three separate broad elements entering into the projection of the image must necessarily travel at different speeds. In other words, the film will travel at one speed, the deflectors of one series will travel at a different speed while the deflectors of the other series will travel at a still different speed. This fact clearly differentiates the invention from all prior art subject matter and defines a clear cut difference between my endeavors and those of others who have gone before. However, in the machine of this invention, these parts are so connected for operation that they will be synchronized at all times and may be collectively or conjointly slowed down or speeded up through the employment of the novel and efficient regulating and controlling means which has been referred to.

Other features of the invention, such for example as novel framing means for properly adjusting or regulating the film with respect to the aperture, while the film is in operation, as well as adjustments of other parts of the machine to render it smooth running and accurate, and others, will appear from the following detailed description and appended claims, when read in conjunction with the accompanying drawings.

The accompanying drawings illustrate one practical embodiment of the invention, but the construction therein shown is to be understood as illustrative, only, and not as defining the limits of the invention.

Figure 1 is a side elevation of a machine embodying this invention, a part of the machine being shown in vertical section in the interest of clearness and certain parts of the manual control mechanism being omitted.

Figure 1ª shows the manual control mechanism illustrated, in part, in Figure 1, in central section.

Figure 4 is an elevation of the mounting for what may be termed the upper series of deflectors. This view shows certain of these deflectors and certain of this view is illustrated as in section on the line 4—4 of Figure 6.

Figure 5 is a section on the line 5—5 of Figure 4.

Figure 6 is a section on the line 6—6 of Figure 5.

Figure 7 is a section perspective of one of the deflector carrying elements, that portion of the element which is broken away being illustrated in dotted lines. The section of this figure is on the line 6—6 of Figure 5.

Figure 8 is an elevation of one of the deflector mounting elements of the lower series of deflectors showing a deflector operatively mounted thereon.

Figure 9 is an edge view of said element.

Figure 10 is a section on the line 10—10 of Figure 8.

Figure 11 is a section on the line 11—11 of Figure 8.

Figures 12 to 15 are optical diagrams illustrating different relative positions which the deflectors of the two series partake. Of these views Figures 12 and 14 are elevational views while Figures 13 and 15 are plan views.

Figure 1:
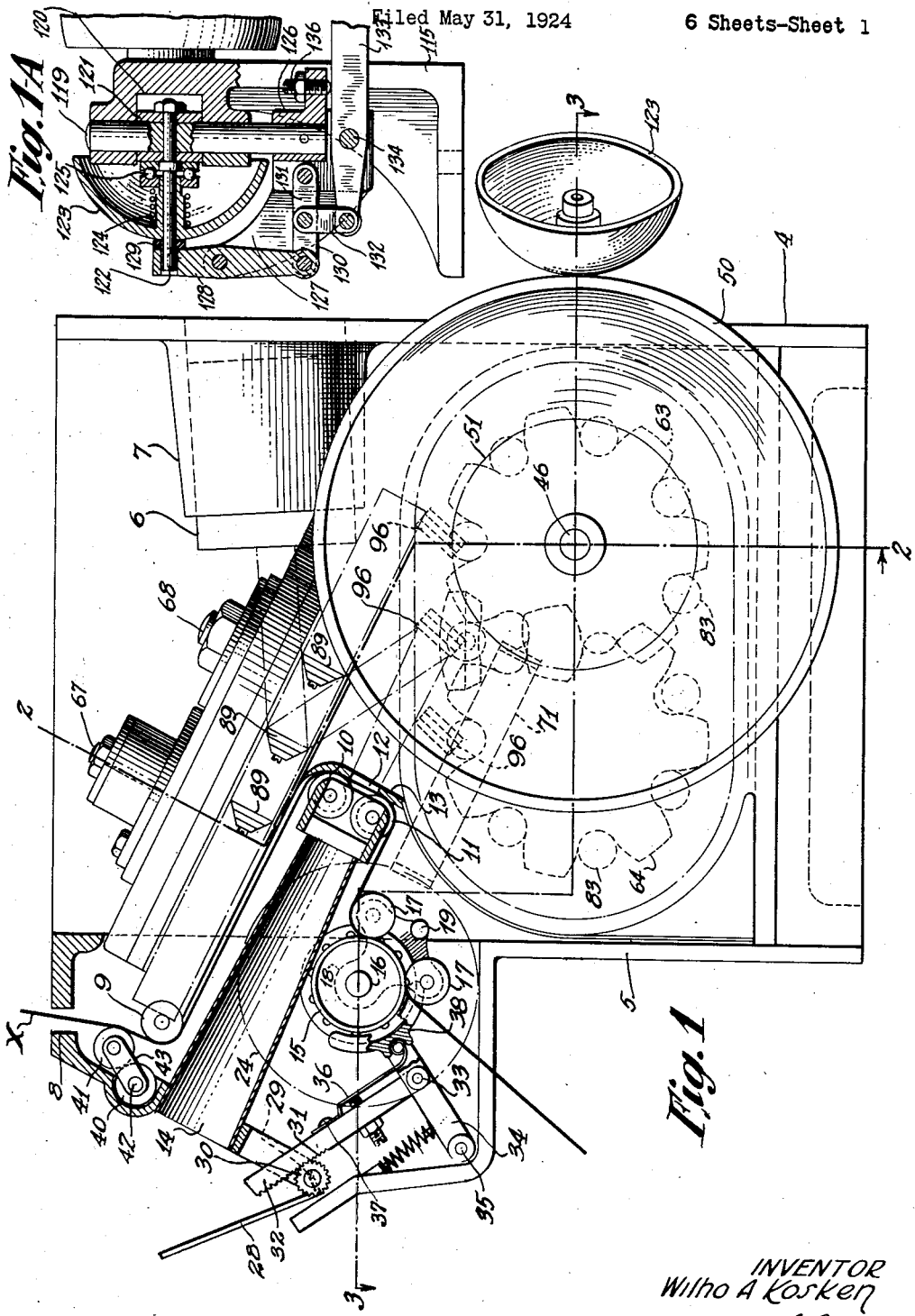
Figure 2:
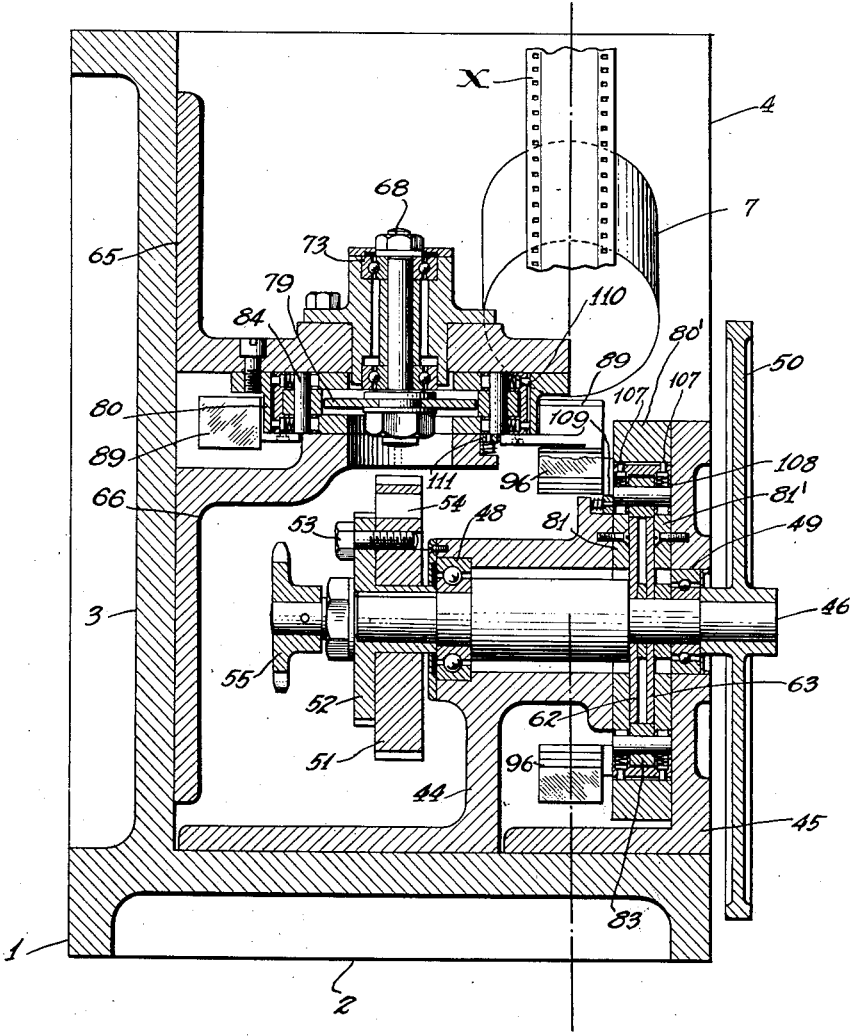
Figure 2 is a vertical section taken on the broken line 2—2 of Figure 1.

The machine shown in detail in the accompanying drawings is assembled upon a frame 1, which, as shown in Figure 2, is substantially L-shaped. The horizontal portion of this frame is designated by the reference character 2, while the vertical portion thereof is designated 3. To one end of the frame is secured a face plate 4 which may be termed the front plate of the machine, while the opposite side of the frame carries a plate 5 which may be designated the back plate. These front and back plates are best shown in Figure 1 of the drawings.

It is desirable in assembling a machine of this character that the several movements or generic parts entering into the construction may be assembled independently of one another and thereafter mounted as units on the frame of the machine. This practice allows of proper assembly and adjustment of the several units and thereafter their conjoint assembly with respect to one another.

Looking at the present machine from a broad and generic standpoint it may be said to comprise five elements, namely, film guiding and driving means, a lower series of deflectors, an upper series of deflectors, driving connections between these parts and an objective lens. To these main or fundamental elements may be added driving means and power transmission and speed controlling means. The machine is so organized and designed that these several parts of the main assembly may be independently assembled and then assembled with respect to one another.

The objective lens shown at 6 in Figures 1 and 2 may be of any suitable and conventional type. A fixed objective is employed and this objective is mounted within a suitable casing 7 formed integral with the front plate 4.

The film is guided through the machine, properly tensioned and adjusted and driven by mechanism assembled on the back plate 5 as is shown best in Figure 1 of the drawings. With reference to this figure, wherein the film is designated X, it will be noted that this film passes through a slot 8 in the top of the back plate casting thence over a directional roll 9 to a directional roll 10, whence it passes to a second directional roll 11 and thence to the driving, tensioning and adjusting means. The two directional rolls 10 and 11 are spaced apart on opposite sides of the light aperture 12 which is formed in a fixed plate 13 mounted in any suitable manner, but shown as carried as a part of the unit constituting the upper deflector unit.

Carried by the back plate and projecting into the machine is a light tube 14 coaxial with the aperture 12 and light from any suitable source is projected through the tube 14 and, after penetrating the film, passes through the aperture 12 and constitutes the beam which is later bent and finally passed through the objective 6 to focus on the screen. Attention is here called to the fact that the parts are so assembled as to cause that portion of the film which is extending between the directional rolls 10 and 13 and across the aperture 12 to be in such relative position to the objective that a plane passing through the medial line of this portion of the film will include the principal axis of the objective. In order to facilitate a clear understanding of the relationship of the parts of the machine with respect to this plane, said plane has been designated in such of the figures of the drawings as it appears by the reference character Y.

In the showing of the drawings, the film is led through the machine without twisting and accordingly this plane Y will pass through the medial line of all parts of the film and in the construction shown this plane will be a vertical plane.

Figure 3:
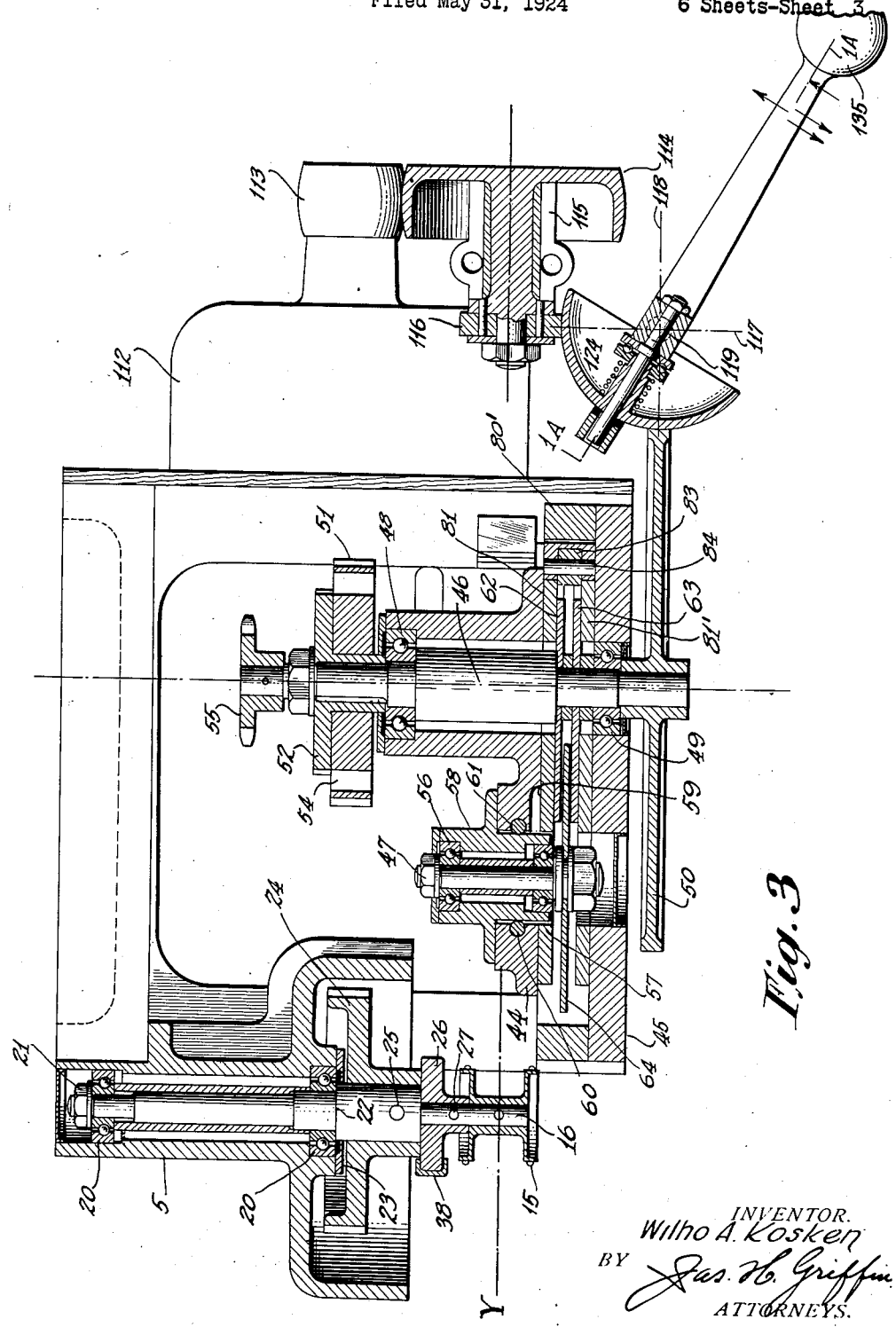
Figure 3 is a horizontal section taken on the broken line 3—3 of Figure 1.

The film is driven or caused to pass through the machine through its cooperation with a sprocket 15 (Figures 1 and 3). This sprocket is fixed to a shaft 16 extending horizontally and transversely through the machine and supported in the manner best shown in Figure 3. The film is maintained in cooperative relation to the sprocket by means of two idlers 17 shown as supported in spaced relation to one another on a bracket 18 mounted for rotation on the shaft 16. A knob 19 associated with this bracket permits of oscillation of the bracket about the shaft to cause longitudinal shifting of the film with respect to the aperture in order that the images on the film may be properly framed.

It will be noted from Figure 3 that the sprocket 15 which drives the film is a double flanged sprocket, each flange being provided with teeth for engagement with the marginal holes at the opposite edges of the film. I have found in practice however that when the film is constantly moving as it is in the present machine, in contradistinction to intermittent periods of movement and rest, that holes along one side only of the film provide for sufficient traction, driving and spacing of the film. This may be a pronounced advantage since the film may be made that much narrower by eliminating from its width that part now required for the extra set of perforations and at the same time eliminating the work and expense incident to the perforating operation of this margin of the film. If this arrangement is employed, one of the flanges of the sprocket may be left smooth or untoothed.

The shaft 16 on which the sprocket 15 and the bracket 18 are supported is mounted as stated after the manner shown in Figure 3. This shaft is mounted to rotate in anti friction bearings 20 supported in the casting of the back plate 5, so that the shaft will turn freely in these bearings. The tail end of the shaft is threaded and a nut 21 is applied to maintain the shaft against displacement from its bearings in one direction while the shaft is stepped as shown at 22 to preclude its longitudinal movement in the opposite direction. By this arrangement, a very smooth running construction is produced practically devoid of lost motion. The bearing 20 nearest the sprocket is held in place by a bearing retainer 23. The shaft 16 has affixed thereto a gear 24 by means of which it is driven through the connections hereinafter described. The teeth of this gear are preferably cut on a 45 degree angle the gear being of the spiral type and fixed to the shaft by a pin 25. Directly adjacent the gear a brake collar 26 is shown as pinned to the shaft by a pin 27.

The purpose of the brake collar 26 is to control a fire shutter which, in the event of stoppage of the machine and consequent stopping of the film, will cause a pivoted flap 28, shown in Figure 1, to close the end of the tube 14 and thus preclude the film from being fired or ignited by the concentrated rays of light on the stationary film. The operative connections for accomplishing this result are clearly shown in Figure 1. The flap 28 is fixed to a shaft 29 to which is also fixed a pinion 30. Meshing with the pinion 30 is a rack 31 formed as a part of the bar 32. This bar is pivoted as shown at 33 to a lever 34 pivoted at 35. The lever 34 is slotted or forked so that a spring 36 secured to the bar at 37 may bear at its free end against a brake shoe 38 adapted to ride on the brake collar or drum 26 (see also Figure 3). A spring 39 normally forces the bar 32 in a downward direction to cause the closing of the flap 28, but as the film travels through the machine and the shaft 16 rotates friction between the brake shoe 38 and collar 26 will overcome the tension of the spring 29 and push the bar 32 upwardly thereby opening the flap 28 and permitting the passage of light through the film. As soon as the apparatus is stopped so that the film comes to rest, the spring 39 will immediately return the parts to initial position and shut off the light from the tube 14.

The employment of a brake on the shaft 16 is in practice a further advantage since by the braking action referred to lost motion in the drive mechanism is taken up and tendency of the gearing to chatter as is the case when gearing is running free is avoided. Noises from gearing is also eliminated in the same manner.

It will be noted that in the upper portion of Figure 1, I have shown two rolls designated 40 and 41. The lower roll is mounted on a shaft 42 fixed in the back plate and extending transversely thereof and this shaft carries the roll 41 through interposed links 43. So long as the film is under tension in the machine, the roll 41 will ride on the film, but if the film breaks, the roll 41 will drop and form a closure for the space between the roll 40 and the directional roll 9, thus serving as a fire trap.

From what has been said, it will be noted that provision is made for the passing of the film past the aperture 12 at a constant speed and that light from any suitable source is projected through the tube 14 and through the film to exit from the aperture 12 in the form of a beam. In accordance with this invention, a series of deflectors are mounted to travel in such manner that each will successively come into cooperative relation with this beam for the purpose of deflecting or bending the beam on to the deflectors of an additional series, at which point the beam is again bent or deflected and directed through the objective 6. For the purpose of terse description, the first set of deflectors impinged by a projected beam may be referred to as the lower or primary series, while the second series of deflectors referred to may be termed the upper or secondary series.

In the practical embodiment of the invention illustrated, the deflectors of the primary series are assembled as a unit with their operating mechanism and are mounted on the base 2 of the frame while the deflectors of the secondary series are similarly assembled and mounted on the vertical or upright portion 3 of said frame. This assembly is clearly shown in Figure 2 of the drawings. I will now proceed to describe the primary deflector unit.

The primary unit is assembled on the base 2 of the frame on two upstanding brackets 44 and 45. These brackets collectively support a shaft 46 while the bracket 44 individually supports a second parallel shaft 47. By reference particularly to Figures 2 and 3, it will be noted that the shaft 46 is journalled for rotation in the bracket 44 by an antifriction bearing 48, while it is journalled for rotation in the bracket 45 by an antifriction bearing 49. One end of the shaft 46 projects beyond the bearing 49 and has affixed thereto a relatively large disc 50 which functions to some extent as a fly wheel but primarily is intended to constitute the driving member for the movement. The outer periphery of this disc 50 may be toothed to provide for a positive drive but in practice I preferably employ a friction drive operating with the periphery of this disc and this friction drive will be hereinafter more fully described as constituting one of the novel and unique features of this invention.

The other end of the shaft 46 is projected beyond the bearing 48 and has affixed thereto a spiral gear 51 which is adjustable universally with respect to the shaft 46 by virtue of the adjustable relationship between this gear and the flange 52. This flange is provided with a hub keyed to the shaft and on which hub the gear 51 is mounted for rotation. One or more circumferential slots are provided in the flange 52 and a corresponding number of locking screws 53 pass through these slots and thread into tapped holes in the gear 51 so that after proper circumferential adjustment of the gear 51 has been obtained, the parts may be locked together by tightening the locking screws 53 so that such adjustment may be retained. The outer periphery of the flange 52 is toothed and the gear 51 is provided with a hole 54 so that a pinion rod may be introduced into this hole, whereupon rotation of this rod will effect nice adjustment of the gear prior to tightening the screws 53. By this arrangement extremely fine adjustment can be obtained in a simple and accurate manner.

To the extreme end of the shaft 46 is fixed a sprocket gear 55 which in this machine is utilized to drive the take-up roll (not shown) of the film through an interposed sprocket chain.

The shaft 47 which is parallel to the shaft 46 and spaced therefrom is supported wholly on the bracket 44 by means of two sets of antifriction bearings 56 and 57 so that said shaft is free to rotate. The distance between the shafts 46 and 47 may however be adjusted by virtue of the assembly shown in Figure 3. From this figure, it will be noted that the shaft 47, instead of being journalled directly in the bracket 44, is journalled in a journal box 58 which is guided for movement in a direction toward and away from the shaft 46 in an opening 59 in the bracket 44. The opening 59 is, however, while fitting snugly the upper and lower faces of the journal box, somewhat longer than such box, so as to permit sliding movement of the box in a direction toward and away from the shaft 46. This movement may be controlled by means of two screws 60 and 61 which are threaded through the bracket at each end of the opening in such manner that they will partially project into the opening 59. Both of these screws have tapered portions adapted to engage with the opposite sides of the journal box, so that by screwing one screw in and the other out the journal box may be shifted longitudinally of the opening 59 and will be maintained in adjusted position by these screws.

The purpose of providing this adjustment between the shafts 46 and 47 is to enable deflector driving discs associated with these respective shafts to properly cooperate. Of these discs two, designated 62 and 63 are mounted in spaced relation on the shaft 46 and one designated 64 is mounted on the shaft 47 with all of such discs in such relation that the disc 64 will extend between the two discs 62 and 63.

These three discs are all of the same shape, size and configuration and correspond exactly in these essentials to the corresponding discs employed in conjunction with the deflectors of the secondary series and in order that the coordination of these parts may be clearly understood, I will now describe the general mounting of the parts for the secondary series and thereafter set forth the manner in which the deflectors of both series are mounted on and operated thereby.

From Figure 2 of the drawings, it will be noted that the upper deflector unit is supported collectively on two brackets 65 and 66, which are bolted or otherwise secured to the upstanding portion 3 of the frame.

By reference to Figures 4, 5, and 6 in which the operating parts of the secondary deflector mechanism are shown in detail, it will be noted that there are two shafts 67 and 68, which, in function, correspond very closely to the shafts 46 and 47, respectively. The shaft 67, which is the drive shaft for the upper unit, is journalled in bearings 69 and 70 carried by the brackets 65 and 66, respectively. One end of the shaft 67 has affixed thereto a gear 71 which constitutes a drive gear for this unit. This gear is a spiral gear similar to the gears 51 and 24 and when the brackets are assembled in proper relation on the upright portion 3 of the frame, the gear 71 is so positioned as to be interposed between the gears 51 and 24 and to mesh with both, so that when the gear 51 is driven from the main drive shaft 46 of the lower movement, power is transmitted from this shaft through the gear 51 to the gear 71 for driving the upper movement and at the same time the gear 71 imparts rotation to the gear 24 to drive the film feed.

Reverting again to Figures 4 and 6, it will be apparent that the shaft 68, which is parallel to and spaced from the shaft 67 is mounted for free rotation in a journal box 72 by means of two bearings 73 and 74 so as to rotate idly therein, and, moreover, the journal box 72 is mounted for adjustment by means of two tapered screws 75 and 76 which correspond in function to the screws 60 and 61 of the lower movement so that through the manipulation of these screws 75 and 76 correct adjustment of the distance between centers of the shafts 68 and 67 may be made. Fixed on the shaft 67 are two drive discs 77 and 78 corresponding to the drive discs 62 and 63 of the lower movement while fixed on the shaft 68 is a single drive disc 79 corresponding to the single disc 64 of the lower movement. Bearing the same relation as the discs of the lower movement, the disc 79 of the upper movement extends between the discs 77 and 78 of such movement, as is clear from Figures 4 and 6.

The purpose of these cooperating drive discs is to effect proper operation of a plurality of deflectors in order that these deflectors may be moved in synchronism with the other operating parts of the machine into and out of cooperative relation with the beam of light to be bent during its passage between the film and the objective. In order that these deflectors may be properly supported and guided for such movement and at the same time driven by the drive discs which have been referred to, I form these drive discs with toothed peripheries so that they simulate gears and utilize the teeth of such discs to drive deflector carriers properly guided along fixed and predetermined paths. Inasmuch as I have illustrated the details of the deflector mounting and driving means with reference particularly to the upper movement, I will now describe the details entering into this construction and it is to be understood that the principles here involved are duplicated in the lower movement.

Referring now especially to Figures 5 and 6, it will be noted that two substantially oval guides are provided. The outer guide which is designated 80 is substantially semi-circular at its terminii, which are connected by relatively straight top and bottom portions. Spaced within the outer guide 80 is an inner guide 81, this guide 81 being composed of two sections which are positioned on opposite sides of the drive discs 77, 78 and 79. The corresponding guides of the lower movement are designated 80' and 81'. Between the inner and outer guides 80 and 81 are positioned a plurality of followers designated 82 and one of which followers is shown in detail in Figure 7. The followers are placed end to end between the guides and a sufficient number of them are included so that they will collectively constitute a substantially continuous train with contiguous ends of adjacent followers engaging or substantially engaging one another. The opposite end portions of each of the followers 82, as shown in Figure 7, is bifurcated and the lower portion of the central portion remaining is cut away to receive a roller 83 mounted on a pin 84. The bifurcations are designated 85 and 86 in Figure 7 and it will be noted from Figure 6 that the blind ends of the bifurcations taken collectively with the curvature of the roller 83 are of such contour as to properly cooperate with the contour of the teeth of the drive discs. The bifurcations 85 and 86 of the followers are moreover of a width slightly greater than the aggregate width of the three cooperating toothed discs, so that the teeth of the discs 77 and 78, as well as the teeth of the disc 79, can properly cooperate with the rollers 83 and the undercut medial portions of the followers.

The parts are assembled after the manner shown in Figure 6 and from this view, it will be apparent that if the shaft 67 is driven to rotate the toothed discs 77 and 78, the teeth of these discs will positively drive such followers as such teeth engage while those followers which are not directly engaged by the teeth of these discs will be moved or pushed along by those followers which are directly engaged, and during this operation the single toothed disc 79 will serve as an idler. By this method of driving the followers they are moved along between the inner and outer guides 80 and 81 at a uniform speed so long as the shaft 67 is driven uniformly. There will be no jerky motion and while the followers are traversing straight sides of the guide, their movement will be rectilinear so that if deflectors are mounted on these followers, the path of movement of these deflectors will be fixed and predetermined.

It may be here stated that with the toothed discs 62, 63 and 64 of the lower movement are associated followers operating between guides as has been described in conjunction with the mechanism of the upper movement and these followers of the lower movement function in the same manner as those of the upper movement and in both cases deflectors are mounted on the respective followers, though as will presently appear the deflectors of the lower movement are disposed somewhat differently with respect to the followers than those of the upper movement.

The deflectors of the upper series bear the reference character 87 and each of which is mounted on a deflector carrier 88, which is in the form of a bracket and so constituted that one surface of the bracket may be brought into face abutting relation with one of the followers and doweled, screwed or otherwise permanently secured in place thereon. In Figure 7, the bolt or dowel holes for this purpose are designated 89. The deflectors in practice are preferably provided with a suitable backing 90 interposed between the deflector proper and the bracket on which it is supported and screws 91 pass through the bracket and into the backing 90 to which the deflector is secured.

From Figures 4 to 6 it will clearly appear that the deflectors are so mounted with respect to the followers that they extend outwardly in a substantially radial direction and from Figure 4, it is apparent that the upper and lower edges of each deflector, as well as the corresponding edges of the backing and that portion of the bracket to which the backing is secured, taper or are bevelled off as shown at 92, the purpose of which is to eliminate shadows between successive exposures as will hereinafter more clearly appear.

In Figures 8 to 11, inclusive, one mounting, such as is employed for the deflectors of the lower series is illustrated. This mounting embodies a bracket or holder 93 perforated at 94 to allow of attachment of the bracket to a follower of the lower series by screws or dowels passed through these perforations and entering perforations corresponding to the perforations 89 of Figure 7. The holder 93 has a laterally projecting portion 95 disposed in angular relation to the major portion of the holder and adapted to constitute a direct support for the deflector which is designated 96. In order to permit of proper adjustment of the parts, each deflector of the lower series is preferably made adjustable on its supporting bracket in order that absolute accuracy in the bending of the beam through the bringing of the deflectors of the lower series in proper cooperative relation to the deflectors of the upper series may be obtained. In Figures 8 to 11 this construction is clearly shown.

The backing member 97 of the deflector has rigidly fixed thereto a threaded post 98 which extends through a perforation 99 in the portion 95 of the bracket and receives an adjusting nut 100. A helical spring 101 is coiled around the post between the nut 100 and the bracket and serves to impel the deflector in the direction of the part 95. In line with the post 98, but on opposite sides thereof are a pin 102 and a ball 103. The pin 102 is fixed in the part 95 and extends into a socket in the backing 97 while the ball 103 is secured to the part 95 by a screw 104 and seats in a socket in the backing 97. The tension of the spring 101 maintains the pin and ball in their respective seats, while permitting of tilting movement on an axis passing through the ball 103, post 98 and pin 102. This tilting movement is effected by means of screws 105 threaded into the part 95 on either side of said axis and it will be noted from Figure 11, wherein one of these screws is shown that the screw has a tapered head 106, bearing upon backing 97 of the deflector. Inasmuch as both of these screws have tapered heads and are respectively positioned on opposite sides of the axis on which the deflector may oscillate, it becomes apparent that the loosening of one screw and the corresponding tightening of the other will effect a tilting adjustment of the deflector on the axis referred to. Moreover, if both screws are screwed inwardly the axis will be up tilted, while it both screws are screwed outwardly the tilting will be in the opposite direction. In other words, through the adjustment of these two screws, I am enabled to obtain universal movement with accurate regulation and adjustment.

It will be noted from Figure 11 that the tapered head of the screw 105 reacts against the tapered portion of the hole in which the screw is inserted and effects slight bending of the screw to exert pressure against the backing of the deflector. As these screws are made quite long in practice they are well able to withstand slight bending action or torque thereon and it is found that inasmuch as the screw is placed under tension by this operation there is an automatic locking of the parts when the adjustment has been completed.

When each of the followers of the lower movement is equipped with a construction such as shown in Figure 8, and each of the followers of the upper movement similarly equipped with deflectors as shown in Figures 4 to 6, there is interposed in the path of the light beam between the film and the objective, two series of deflectors which cooperate with one another and with the beam from the aperture to effect proper bending of the beam while maintaining constant focal length. It should of course be understood that care should be exercised in the assembling of the machine to the end that the operation of the lower series of deflectors will cause them to successively intercept the path of the beam of light from the aperture 12 and that the adjustment of the deflectors of the lower series and the relative position of the deflectors of the upper series must be such that as the deflectors of the lower series bend the beam upwardly it will impinge the deflectors of the upper series in succession and will in turn be bent by these latter deflectors and directed through the objective lens.

It is of course important that the deflectors should travel smoothly and without lost motion while the projected or deflected beam is impinging such deflectors and while the guides in which the followers operate are machined relatively true, there would be, unless suitable means were provided to the contrary, certain lost motion which would be apt to cause idle and deleterious movement of the deflectors. In order to preclude such lost motion and take up any wear which may occur, each of the followers of the lower series is provided with a plurality of pressure pins 107 with each of which is associated a spring 108 which causes the pins to be forced outwardly against the inner surface of the outer guide 80 and through this pressure the followers will be caused to firmly bear at all times against the outer surface of the inner guide 81 on which they will ride smoothly. A pronounced advantage of this construction resides in the fact that very accurate machining of the guides, i. e., accurate spacing of them apart, during the manufacture of the machine is rendered unnecessary thereby minimizing in cost factors.

To preclude lateral lost motion of these followers, the bracket 44 is shown in Figure 2 as equipped with a spring pressed member or strip 109 which bears against the inner faces of the followers during the time that they approach and recede from cooperative relation to the beam and force the followers to travel during this time in constant engagement with the inner face of the bracket 45. By both of these spring pressed adjuncts, the followers are properly maintained against shifting due to lost motion and the deflectors are caused to travel into and out of cooperative relation with the beam in a smooth and positive manner.

It will be noted from an inspection of Figure 2 that the followers of the upper series of deflectors are similarly equipped with spring pressed pins 110 corresponding to the pins 108 and a spring pressed guide 111 corresponding to the guide 109 so that the upper followers are also stabilized and lost motion is precluded.

It will thus appear that all of the followers will operate smoothly to bring the deflectors of the respective series into and out of cooperative relation with the beam and it will be apparent from an inspection of Figure 1 that while the lower series of deflectors during their approach and recedence from such cooperative relation travel in a substantially horizontal plane, the deflectors of the upper series, during such approach and recedence, travel in an incline plane.

It should be borne in mind however that while the deflectors are in cooperative relation and as they approach and recede from such relation, they are travelling along such paths that their vertical medial lines will lie in a plane common to the vertical plane of the principal axis of the lens and the vertical medial plane of the film. This is apparent from many figures of the drawings, which show the details of the machine, but is expressly and more particularly illustrated in Figures 12 to 14, which are directed to the showing of optical diagrams. For the purpose of illustration, I have shown in these figures only those rays which are parallel, the non-parallel rays being omitted in the interest of clearness and simplicity.

In these figures $96^a$, $96^b$ and $96^c$ designated three deflectors of the lower series while $89^a$, $89^b$ and $89^c$ designate three deflectors of the upper series. In Figures 13 and 15, Y designates a common plane which includes the principal axis of the lens while in Figures 12 and 14, Z designates the principal axis of the lens and Z' a line drawn parallel to the principal axis Z and in the same vertical plane. The arrow $a$ shows the direction of travel of the deflectors of the lower series in the plane Y while the arrow $b$ shows the direction of travel of the upper series of deflectors in the plane Y.

It is to be noted that in the machine of this invention, there is always an angular relation between the path of travel of the deflectors of the upper series with respect to the principal axis Z of the lens, that there is an angular relation between the direction of travel of the deflectors of the upper series and the deflectors of the lower series and that there is necessarily an angular relation between the direction of travel of the deflectors of the lower series and the axis of the lens. In other words, the deflectors of each series travel in a direction which is in angular relation to the principal axis of the lens and to the direction of travel of the deflectors of the other series. This is apparent from Figures 12 and 14 where a pronounced angular relation is shown between the lines $b$ and Z and a lesser although clearly apparent angle between the lines $a$ and Z'. It should be borne in mind, however, that this angular relation which has been referred to, has to do with lines drawn in a common plane since, as has been stated, the film and both series of deflectors travel in a common plane which includes the principal axis of the lens. The particular angularity between these parts will be hereinafter described in detail.

These general facts, however, clearly differentiate the structure of this invention from all prior art practice as no arrangement of this character has ever heretofore been published. It may be here noted that inasmuch as the lines $a$ and $b$ are in angular relation to one another and to the principal axis of the lens, and since these parts must be synchronized with respect to the moving film to effect an accurate cooperation, it is apparent that all of said moving parts must travel at different speeds. That is to say, the film travels at one speed, the deflectors of the lower series travel at a different speed, while the deflectors of the upper series travel at another and different speed, so that there are three distinct speeds for the three distinct moving elements.

The speeds of these three moving elements are determined primarily (1) by the speed at which it is desired to move the film and (2) by the degree of obliquity of the planes of the deflectors of one series with respect to the planes of the deflectors of the other series. This naturally follows from the fact that inasmuch as these three elements are all approaching the light beam from different directions and in different angular relation to one another, they must travel at different speeds to properly coact with one another during cooperation with said beam. For example, and without in anywise limiting to particular proportions in speeds of travel of these elements, it may be stated that if speed of travel of the film, as seen in Figure 12 is assumed to be 1, then, in practice, the speed of the deflectors of the primary series is approximately 1⅔ and speed of the secondary deflectors is approximately 1⅓.

From Figures 12 and 14, the manner in which the deflectors of the two series cooperate in the bending of the beam will be clearly apparent. In the former figure, the deflectors of the lower series are in such position that a beam of light passing through the film X and thence through the aperture 12 will be projected upon and wholly received by the deflector $96^b$ and this deflector will bend the beam upwardly and upon the deflector $89^b$ on which it is wholly received. This latter deflector will in turn bend the beam and deflect it through the lens 6. In other words, the deflectors of the upper and lower series are in such position that the deflectors $96^b$ and $89^b$ will cooperate to the exclusion of all others in the bending of the beam. This relationship occurs but momentarily since as the deflectors continue to move in the direction of the arrows $a$ and $b$, the beam will clear the upper edge of the deflector $96^b$ and such portion of the beam as clears this edge will be received on the deflector $96^a$ as shown in Figure 14, so that the deflectors $96^b$ and $96^a$ will cooperate with the deflectors $89^b$ and $89^a$ in the bending of the beam. As the deflectors continue to move a lesser portion of the beam will be deflected by the deflectors $96^b$ and $89^b$ while the constantly greater portion of the beam will be received on and deflected by the deflectors $96^a$ and $89^a$ until the whole beam will be received on and deflected by the deflectors $96^a$ and $89^a$ so that the relationship of the beam to the deflectors will be the same except for reference characters as is shown in Figure 12. This operation is repeated rapidly as the deflectors successively approach and recede from cooperative relation with the beam.

A very important consideration entering into this construction purely from the standpoint of the optics of the case is that the optical length of the transmitted beam between the film and the objective lens is not changed through this bending by the deflectors in the manner described, but is, in practice uniform. In other words, although the deflectors of the two series concurrently operate to bend the beam the optical focus is constant so that there is no distortion. Moreover, by placing the deflectors as shown and operating them at the angles shown, there are no shadows but the pictures are projected on the screen in clear cut sequence and with a rapidity depending only upon the speed of operation of the machine. It is to preclude the blocking off or production of shadows by the upper series of deflectors that they are tapered as shown in Figure 4, the purpose of this tapering being manifest particularly from Figure 12, wherein the beam is shown as passing directly adjacent the edges of the deflector 89$^a$. By this arrangement the deflectors can be placed very close together and so disposed that the beam upon leaving one deflector will immediately impinge the next, this being a very important point in correct projection.

I wish to here point out very clearly that thorough experimentation and practical demonstration have shown beyond question that in order to properly function in the bending of light beams in the manner described there must be a definite angular relationship between the deflectors of the lower series and those of the upper series. By this angular relationship I mean the angular relationship between the deflecting surfaces of these deflectors and I have found that this angular relationship must, in order to produce satisfactory projection without the employment of a shutter and with a continuously moving film have a fixed and predetermined ratio of 2 to 1. That is to say, the angle of incidence which the transmitted beam makes with the deflectors of one series must be equal to one-half the angle of incidence which said beam makes with the deflectors of the other series. I consider myself a pioneer in this discovery and practice has demonstrated that the ratio referred to is the only one which will satisfactorily provide for the projection of motion pictures in the manner stated through the employment of a standard motion picture film. By reference to Figure 12, it will be noted that this ratio is carried out. In this figure, the line $n$ has been drawn normal to the plane of the deflector 96$^b$ while the line $b$ is normal to the deflecting surface of the deflector 89$^b$. Moreover, the lines $n$ and $b$ are erected midway of the width of the respective deflectors and at the point where the medial ray of the beam will impinge these deflectors. Therefore in a machine embodying this invention, the angle designated $\frac{\alpha}{2}$ is equal to one-half the angle $\alpha$. Of course these angles may be reversed as to film and lens but between the angles of incidence which the beam makes with the two deflectors there is a constant ratio of 2 to 1 and on this ratio is based the operativeness of the present invention as a commercial proposition employing standard motion picture films.

In order that the deflectors of both series may properly cooperate with the beam to be bent, these deflectors must, moreover, travel along the lines of direction of movement $a$ and $b$ which bear such angular relation to the principal axis of the lens as to bring about accurate coaction between the deflectors of said series and the film and lens while maintaining the angle of incidence ratio of 2 to 1.

While the showing of Figures 12 to 14 is illustrative and does not define the limits of the invention, a detailed description of the angular relationship between these elements will render their optical operation clearly apparent.

Thus, in Figures 12 and 13, wherein the lines Z, $b$, $a$ and Z' are occupying the same plane, a definite relationship between the parts is shown. E. G., the angle of incidence $\frac{\alpha}{2}$ is shown as 15 degrees, while the angle $\alpha$ is 30 degrees. The line $b$ is normal to the deflecting planes of the deflectors 89$^a$ and 89$^c$ and passes through the vertex of the angle $\alpha$. Accordingly, the line $b$ makes an angle with axis Z equal to the angle of incidence $z$.

The line $a$ is shown as divergent to line Z' which is parallel to Z and said line $a$ intersects with line $b$ to form an angle which is less than angle $\alpha$ and greater than angle $\frac{\alpha}{2}$.

The deflectors 96$^a$, 96$^b$ and 96$^c$ are inclined with respect to the lines $a$ and Z' in an angular relationship with the latter equal to three times the angle of incidence of said deflector $\frac{\alpha}{2}$.

Moreover, as shown in Figure 12, the film travels in a plane parallel to the deflecting surfaces of the deflectors 89$^a$, 89$^b$ and 89$^c$ and perpendicular to line $b$.

It will be noted from Figure 1 of the drawings, that the main drive gears 51, 71 and 24 have the same radius. These gears will therefore rotate at the same speed. The proper relationships between the speeds of the film and the deflectors of the primary and secondary series are obtained by a proper proportioning of the parts which directly drive these elements. Thus it will be noted that the film sprocket 15 is relatively small and will drive the film at a relatively low speed, the drive discs 62 and 63 are of larger diameter and will drive the lower deflectors at a higher speed, while from Figure 6 it will be noted that the drive discs 77 and 78 are of a diameter greater than the diameter of the film sprocket and less than the diameter of the drive discs 62 and 63, so that the deflectors of the secondary series will be driven at a speed slower than the speed of the primary deflectors and faster than the speed of the film.

When all of the said movable parts are operated at different appropriate speeds, they will properly cooperate to project or expose a series of images or exposures while maintaining a constant focal length.

Aside from the maintaining of constant focal length, numerous additional advantages result from the arrangements described. E. G., I am enabled to eliminate detrimental shadows between sucessive images by making the aperture 12 at the film gate practically coextensive with the size of the image on the film and to thereby utilize the entire film surface available for projection. This is distinctly novel in a machine employing a constantly moving film, devoid of shutter mechanism and maintaining a constant focal length. The ability to project a standard film, i. e., one wherein the successive images are directly adjacent one another with their contiguous edges parallel, through a fixed objective lens while utilizing constantly moving deflectors and film and maintaining constant focal length is also a pronounced departure from the prior art and is of manifest importance.

Another feature of the invention which should be noted is that during the exposure or projection of the film, the advancing line of exposure or projection on the surface of the film extends perpendicular to the edges of the film and moves constantly in a direction longitudinally of the film. Those skilled in the art will readily appreciate the advantage of this fact which has not been heretofore commercially possible in prior machines utilizing a constantly moving film. I consider the method of accomplishing this end novel and constituting part of this invention.

The several moving parts of the machine are actuated from a suitable prime mover through the main drive disc 50 which may serve as a fly wheel to steady the operations of the machine. As has been previously stated, the periphery of this fly wheel may be toothed and driven from any suitable prime mover through appropriate gearing, but I prefer to employ a friction drive of novel and unique construction which is shown in detail in Figures 1, 1ª and 3. The prime mover is preferably in the form of a motor 112 to the armature shaft of which is fixed a friction wheel 113. Cooperating with this wheel 113 is a second friction wheel 114 which is journaled in a suitable standard 115 appropriately mounted in rigid relation with respect to the frame of the machine. Rigid with respect to the wheel 114 is a friction pinion 116 which lies in a plane preferably perpendicular to the plane of the fly wheel 50. These two planes are respectively designated 117 and 118. The line of intersection of these two planes determines the axis of an upright pivot pin 119 (see Figures 12 and 13) which pivot pin is mounted for oscillation on a vertical axis in the bracket 115. The bracket is cut away as shown at 120 and a collar 121 encircles the pivot pin and through the collar and pivot pin extends a spindle 122. The spindle is firmly anchored to the pivot pin and collar and extends in perpendicular relation to the axis thereof. On this spindle is a substantially semispherical shell which constitutes an intermediate drive element. This shell designated 123 is mounted to freely rotate on the spindle and is forced in a direction away from the pivot pin by means of a helical spring 124 bearing against one element of an antifriction bearing 125. The hub of the shell extends through said element of the bearing loosely so that sliding movement of the shell longitudinally of the spindle is permitted. Affixed to the lower end of the pivot pin 119 is an operating head 126 integral with which is formed a yoke 127 and at the outer end of this yoke is pivoted a lever 128. The upper end of the lever is perforated so that the spindle 122 extends therethrough, a thrust washer 129 being interposed between the lever 128 and the shell 123.

The lower end of the lever 128 is connected to the operating head 126 by means of a toggle composed of two links 130 and 131, while the elbow of the toggle is connected by a link 132 to one end of an operating lever 133. This operating lever is pivoted to the operating head at 134 and its outer end is provided with a suitable handle 135 as shown in Figure 3. An adjustable stop screw 136 is threaded through the head and serves as a stop for the operating lever for the purpose of setting the toggle slightly over dead center.

The parts are so assembled with respect to the friction drive pinion 116 and the fly wheel 50, that when the shell 123 is in engagement with both the pinion 116 and the fly wheel 50, power will be transmitted from the motor 112 through the friction drive elements 113, 114, 116 and through the intermediate shell 123 to the fly wheel for the purpose of frictionally driving the apparatus. The speed at which the fly wheel is driven may be varied by swinging the handle 135 horizontally in either one direction or the other. If the handle is moved in the direction of the single arrow shown in Figure 3, the speed at which the fly wheel will be driven will be diminished while if the handle is moved in the direction of the double arrow the fly wheel will be speeded up. In this manner, a very accurate control of the speeds of the fly wheel may be obtained, while the motor is operating at a uniform speed.

A very important advantage of the structure shown however is inherent in the fact that the raising or lowering of the handle will permit the engagement or disengagement of the shell with the pinion and fly wheel. Thus when the parts are in the position shown in Figure 1ª with the handle lowered the toggle will be substantially straight and will cause the lever 128 to force the shell free from engagement with both the pinion 116 and the fly wheel 50 so that the motor may operate idly and without driving the apparatus. However, if the handle is lifted the toggle will be flexed to permit the shell to simultaneously engage the driving and driven elements in order to impart rotation to the latter. It will thus be apparent that through the employment of a single handle the machine may be stopped and started or its speed controlled. Such comparative ease and efficiency in the controlling of a motion picture machine is distinctly novel in contradistinction to the practices now prevalent.

The wide range of speed variation which I am enabled to obtain by the construction described is particularly desirable in machines of the character herein under consideration. This machine can be operated at a speed much slower than is possible in machines employing shutters and also at a considerably higher rate of speed while giving thoroughly satisfactory projection devoid of blurring or flicker within reasonable limits.

In the foregoing detailed description of the invention and the mode of operation of the machine specifically described, I have for the purpose of concrete example chosen to set forth the machine as a motion picture projector, but I wish it clearly understood that the machine may be utilized as a camera in which event the film instead of being projected would be a sensitized film exposed through a light beam continuously entering the objective lens 6 and bent twice before impinging and exposing the sensitized film. The present invention is therefore to be understood as covering camera as well as a projector.

It is to be pointed out that a machine constructed as described is remarkably free from vibration and thereby permits of very steady projection. This absence of vibration is due to several features of the construction. In the first place, the deflectors of each series are mounted so as to travel in endless paths so that the inertia of the deflectors will not cause vibration as it does in such machines as have heretofore been suggested and which embody reciprocating deflectors. Experience has shown that where reciprocating deflectors are employed, the inertia of such deflectors, during the stopping and starting or reversing of the movement of such deflectors produces pronounced vibration which it is impossible to eliminate in a machine of that character. With the present machine, however the deflectors run smoothly and continuously without stopping between exposures and, being well balanced, vibration from the common cause referred to is entirely eliminated.

I wish to lay particular stress moreover on the fact that the deflectors as well as the film are in a common plane with the principal axis of the lens. This relationship enables the machine to be built in a very compact form so that it may be of much less size and dimensions than any practical machine which has heretofore been suggested for the projection of standard motion picture films continuously moved. Moreover, the parts of the machine and more especially the operating parts entering into the construction of the upper and lower series of deflectors are structural duplications in many instances so that pronounced manufacturing economy results. Attention may be therefore called to the fact that when the machine is initially assembled the parts may be readily and expeditiously adjusted and are so constituted that when once adjusted such adjustment will be maintained indefinitely while wear will be automatically taken up.

It will of course be understood that a suitable film feed mechanism will be associated with the upper portion of the machine and that a suitable take-up mechanism with appropriate fire gates will be associated with the lower part of the machine, but inasmuch as these feed and take-up mechanisms are well known to the art generally, it is not considered necessary to show and describe them.

In the preferred form of the machine which is power operated as described, if desired, a manual operable machine may be used by simply affixing a handle in conjunction with the fly wheel or in lieu thereof.

I have specifically referred to the film and deflectors travelling in lines of direction of movement which occupy the plane Y passing through the lens axis. This is the ideal condition but inasmuch as there is always more or less slight errors in commercial machines, I wish it understood that a slight variation in this arrangement would not avoid the invention. For example, if the film runs a little to one side so that the medial line of the film would not be exactly in the plane Y correct projection might result. Moreover, if the deflectors were a little to one side they would function properly if the deflectors were of sufficient width to compensate for the error. In any event, these parts would travel in lines parallel to the plane Y if not accurately coincident therewith. To all intents and purposes they would nevertheless occupy said plane.

It may be here pointed out that the ability to operate the machine at widely different speeds varying from a relatively slow speed of operation to a relatively high speed is of pronounced practical importance. The increased speed may be employed to great advantage for the recording of rapidly moving objects and the mechanical mixing or blending of colors while the ability to operate at lower speeds enables more sharply defined pictures with greater detail to be projected or taken.

It should be remembered however that even when the machine is operated at relatively high speeds the wear and tear on the film is much less than that to which a film is subjected in machines of the shutter type and wherein the film is moved with intermediate periods of rest or dwell.

In the machine of the present invention, the wear and tear is practically negligible irrespective of the speed at which the machine is operated since the film travels continuously and is not subjected to strains incident to the jerky motions accompanying rapid stopping or starting of the film.

It will moreover be observed that inasmuch as shutters are not used in the present machine the light is constantly projected upon the screen and higher light efficiency is thus obtained than can be accomplished if a shutter was employed. Moreover, an even illumination results which is in marked contrast to the spaced intervals of interrupted illumination common to the shutter machines now employed.

Attention may also be called to the fact that inasmuch as the light projected upon the screen is reflected light a softer tone less injurious to the eyes and more artistic in its effect will be produced upon the screen and accordingly persons viewing the projected picture will not suffer from eye strain as they do when viewing motion pictures projected from shutter machines wherein, in practically all instances, the light is projected directly through the film and through the objective to the screen.

The foregoing detailed description and the accompanying drawings set forth the present invention in its preferred practical form but the invention is to be understood as fully commensurate with the appended claims.

This application is, at least in part, a continuation of my prior application, Serial No. 606,634, filed December 13, 1922.

Having thus fully described the invention, what I claim as new and desire to secure by Letters Patent is:—

1. In an optical machine capable of projecting consecutive images of a standard motion picture film wherein the consecutive images are directly adjacent one another and have contiguous parallel edges, the combination of an objective, a film gate, means for continuously moving the film past the film gate with its longitudinal medial line parallel to and substantially occupying a plane which includes the principal axis of the objective, a plurality of series of deflectors for bending a beam of light passing between the film and the objective while maintaining a constant focal length, and means for moving said deflectors into and out of cooperation with said beam in paths parallel to said plane.

2. In an optical machine capable of projecting consecutive images of a standard motion picture film wherein the consecutive images are directly adjacent one another and have contiguous parallel edges, the combination of an objective, a film gate, means for continuously moving the film past the film gate with its line of direction of movement substantially occupying a plane which includes the principal axis of the objective, a plurality of series of deflectors for bending a beam of light passing between the film and the objective while maintaining a constant focal length, and means for moving said deflectors into and out of cooperation with said beam along lines of direction of movement included in said plane.

3. In an optical machine capable of projecting consecutive images of a standard motion picture film wherein the consecutive images are directly adjacent one another and have contiguous parallel edges, the combination of an objective, a film gate, means for continuously moving the film past the film gate with its longitudinal medial line parallel to and substantially occupying a plane which includes the principal axis of the objective, two series of deflectors for bending a beam of light passing between the film and the objective, and means for moving said deflectors into and out of cooperation with the beam in paths parallel to said plane, the deflectors of the respective series being so inclined with respect to one another that said beam will have an angle of incidence with respect to the deflectors of one series twice as large as the angle of incidence which said beam makes with the deflectors of the other series.

4. In an optical machine capable of projecting consecutive images of a standard motion picture film wherein the consecutive images are directly adjacent one another and have contiguous parallel edges, the combination of an objective, means for moving a film continuously, means for projecting a beam of light through the film, a primary series of deflectors mounted to travel continuously along a direction of movement included in a plane which also includes the principal axis of the objective to bring said deflectors consecutively into and out of cooperative relation with the beam, said deflectors being tilted to bend said beam, a secondary series of deflectors mounted to travel along a line of direction of movement also included in said plane to consecutively bring the deflectors of the secondary series into cooperative relation with the beam deflected from the primary series, and the deflectors of the secondary series being tilted with respect to the deflectors of the primary series to further deflect the beam and direct it through the objective, the angle of incidence which the beam makes with the deflectors of one series being twice the angle of incidence which the beam makes with the deflectors of the other series, whereby a constant focal length is obtained.

5. In an optical machine capable of projecting consecutive images of a standard motion picture film wherein the consecutive images are directly adjacent one another and have contiguous parallel edges, the combination of an objective, a constantly travelling film and two series of constantly travelling deflectors with the lines of direction of movement of the film and deflectors occupying a plane including the principal axis of the objective, the deflectors of one series being adapted to be successively impinged by a beam of light passed through the film and to deflect said beam upon the deflectors of the other series where it is further deflected and passed through the objective, and the angle of incidence which said beam makes with the deflectors of one series being twice the angle of incidence which the deflected beam makes with the deflectors of the other series, whereby a constant focal length is maintained.

6. The combination with a lens of a series of deflectors travelling along a line of movement which intersects the principal axis of the lens and occupies a common plane including the principal axis, a second series of deflectors travelling along a line of direction of movement which intersects the principal axis of the lens and also intersects the line of direction of movement of the deflectors of the first series and is included in said plane, and a film movable in a plane which said common plane intersects in a line passing through the center of the film, the deflectors of the first and second series being tilted with respect to one another to cause a beam of light passing between the lens and the film to have an angle of incidence with respect to the deflectors of one series equal to twice the angle of incidence which the beam has with respect to the deflectors of the other series.

7. The combination of a lens, a series of light deflecting elements traversing the principal axis of the lens, a film mounted to travel along a path wherein a plane including the principal axis of the lens and the line of direction of movement of said deflecting elements will intersect the film centrally of its width, a second series of light deflecting elements mounted to travel in a line of direction of movement also included in said plane, the deflectors of both series being tilted and adapted to cooperate to flash a beam of light between the lens and film which beam of light has an angle of incidence with the deflectors of one series equal to twice the angle of incidence which the beam has with the deflectors of the other series.

8. The combination of a lens, two series of deflectors mounted to travel along lines of direction of movement occupying a common plane including the principal axis of the lens and a film mounted to travel in a plane substantially perpendicular to the direction of movement of one series of deflectors.

9. The combination of a film mounted for continuous movement, a lens, a plurality of series of deflectors adapted to bend a beam of light during the passage of the beam between the lens and the film, the deflectors of each series being mounted to move consecutively into and out of cooperation with said beam with the line of direction of movement of the deflectors of one series intersecting the principal axis of the lens at an angle equal to the angle of incidence which the deflectors of that series make with said beam, said axes of movement, as well as the principal axis of the lens, occupying a plane which passes through the longitudinal medial line of the film.

10. The combination of a film mounted for continuous movement, a lens, a plurality of series of deflectors adapted to bend a beam of light during the passage of the beam between the lens and the film, the deflectors of each series being mounted to move consecutively into and out of cooperation with said beam with the line of direction of movement of the deflectors of one series intersecting the principal axis of the lens at an angle equal to the angle of incidence which the deflectors of that series make with said beam, and the line of direction of movement of the deflectors of another series also intersecting with the principal axis of the lens but at a lesser angle of such degree that the angle of incidence which the beam makes with the deflectors of one series will be substantially twice the angle of incidence which the beam makes with the deflectors of the other series.

11. The combination of a film mounted for continuous movement, a lens, a plurality of series of deflectors adapted to bend a beam of light during the passage of the beam between the lens and the film, the deflectors of each series being mounted to move consecutively into and out of cooperation with said beam with the line of direction of movement of the deflectors of the first series intersecting the principal axis of the lens at an angle equal to the angle of incidence which the deflectors of that series make with said beam, and the line of direction of movement of the deflectors of a second series also intersecting with the principal axis of the lens but at an angle less than one half said angle of incidence, and the deflectors of said second series being inclined at such angle to the line of direction of their movement that the beam of light passing between the lens and film will have a constant focal length.

12. The combination of a film mounted for continuous movement, a lens, two series of deflectors adapted to bend a beam of light during the passage of the beam between the lens and the film, the deflectors of each series being mounted to move consecutively into and out of cooperation with said beam along separate lines of direction of movement both of which intersect the principal axis of the lens at different angles, and said lines of direction of movement occupying a common plane in which the principal axis of the lens is included, the deflectors of both series being inclined with respect to one another at an angle adapted to produce constant focal length of the beam during its passage between the lens and film.

13. The combination of a film mounted for continuous movement, a lens, two series of deflectors adapted to bend a beam of light during the passage of the beam between the lens and the film, the deflectors of both series being inclined with respect to one another at an angle adapted to produce constant focal length of such beam during its passage between the lens and film and the deflectors of each series being mounted to move consecutively into and out of cooperation with said beam along separate lines of direction of movement which intersect with one another to form an angle greater than the angle of incidence which the beam has with the deflectors of one series and less than the angle of incidence which said beam has with the deflectors of the other series.

14. The combination of a lens, a film, a plurality of series of movable deflectors for bending a beam of light passing between the lens and the film, said deflectors being inclined to produce angles of incidence which the beam makes with the deflectors of both series appreciably less than forty-five degrees and adapted to produce constant focal length of such beam during its passage between the lens and film.

15. The combination of a lens, two series of cooperating deflectors mounted to travel in lines of direction of travel included in a common plane which also includes the principal axis of the lens, and a film mounted to travel in a plane parallel to the deflecting surfaces of the deflectors of one of said series.

16. The combination of a lens, a film, primary and secondary series of moving deflectors operable along lines of direction of movement occupying a common plane including the principal axis of the lens and adapted to bend a beam of light during its passage between the lens and film, the deflectors of the primary series being inclined and occupying parallel planes intersecting the plane of the film at an angle equal to half the angle of incidence which the beam of light makes with the deflectors of the secondary series.

17. The combination of a lens, a film, primary and secondary series of moving deflectors operable along lines of direction of movement occupying a common plane including the principal axis of the lens and adapted to bend a beam of light during its passage between the lens and film, the deflectors of one series being inclined with respect to the deflectors of the other series and forming an included angle which is equal to the angle of incidence which the beam makes with the deflectors of the primary series.

18. The combination of a lens, a film, primary and secondary series of moving deflectors operable along lines of direction of movement occupying a common plane including the principal axis of the lens and adapted to bend a beam of light during its passage between the lens and film, the deflectors of one series being inclined with respect to the deflectors of the other series and forming an included angle which is equal to the angle of incidence which the beam makes with the deflectors of the primary series, and means for driving the film, the primary series of deflectors and the secondary series of deflectors continuously and at different speeds.

19. In an optical machine capable of projecting consecutive images of a standard motion picture film wherein the consecutive images are directly adjacent one another and have contiguous parallel edges, the combination with a film gate, means for projecting a light beam through the film and through the aperture, a lens, primary and secondary series of deflectors for bending said beam and directing it through the lens, and means for continuously moving the film, the deflectors of said primary and secondary se- 20. In a motion picture machine, the combination with a deflector holder, of a deflector mounted for pivotal movement on the axis extending in one direction, means for pivotally adjusting the deflector on such axis, and means for tilting the deflector to tilt said axis.

21. In a motion picture machine, the combination with a deflector holder, of a deflector, a pair of trunnions on which the deflector is mounted for pivotal adjustment on an axis extending in one direction, means for yieldably maintaining the deflector in engagement with the trunnions, and means for pivotally adjusting the deflector on said trunnions.

22. In a motion picture machine, the combination with a deflector holder, of a deflector, a pair of trunnions on which the deflector is mounted for pivotal adjustment on an axis extending in one direction, means for yieldably maintaining the deflector in engagement with the trunnions, and means for pivotally adjusting the deflector on said trunnions and for simultaneously tilting the deflector to tilt said axis.

23. In a motion picture machine, the combination with a deflector holder, of a deflector, means for yieldably drawing the deflector in the direction of its holder, and screws threaded into the holder in directions parallel to the face of the holder, said screws being provided with tapered portions adapted to bear against the deflector and operable, upon rotation of the screws, to tilt the deflector longitudinally or transversely or simultaneously longitudinally and transversely.

24. In a machine for consecutively projecting the juxtaposed images of a standard motion picture film, in combination with an objective lens and means for uninterruptedly moving the film between said lens and a source of light with the longitudinal medial line of the film disposed approximately in a plane which includes the principal axis of the lens; deflecting means arranged between the lens and film for bending the light beam a plurality of times with the angle between each incident ray and the corresponding reflected ray less than 90° while maintaining a constant focal length, said means including a series of spaced deflectors moving through said plane of the lens axis in a line perpendicular to the plane of the film, and another series of deflectors moving through the said plane in a direction non-perpendicular to the plane of the film.

25. In a machine for consecutively projecting the juxtaposed images of a standard motion picture film, in combination with an objective lens and means for uninterruptedly moving the film between said lens and a source of light; means for bending the image projecting light beam between the film and objective lens including a series of deflectors, and means for continuously moving said deflectors through a plane including the principal axis of the objective lens and in an angular direction perpendicular to the plane of movement of the film.

26. In a machine for consecutively projecting the juxtaposed images of a standard motion picture film, in combination with an objective lens and means for uninterruptedly moving the film between said lens and a source of light, two series of deflectors, means for continuously moving each series of deflectors through the said plane, one series of deflectors moving in a direction perpendicular to the plane of movement of the film, and the other series of deflectors moving in a directional line divergently related to the line of movement of the first series, said deflectors of the two series when moving through the projection zone being positioned to cooperate with each other and bend the light beam a plurality of times while maintaining a constant focal distance of the beam between the film and the lens.

27. In a machine for consecutively projecting the juxtaposed images of a standard motion picture film, two series of deflectors mounted and arranged for continuous movement along closed paths through the zone of projection of a light beam between an uninterruptedly moving film and an objective lens, with the optically operative portion of each path located in a plane including the principal axis of the lens, the deflectors in one series being disposed in parallel planes relative to each other each bearing an oblique angular relation to the planes of the deflectors in the other series whereby single deflectors in the two series will cooperate with each other or adjacent deflectors of the two series will collectively cooperate with each other in their movement through the projection zone to bend the image projecting light beam without destroying the continuity of the image.

28. The method of projecting pictures from an uninterruptedly moving standard film and maintaining constant focal length, which consists in arranging two series of deflectors for continuous movement through the zone of projection of a light beam passing between the film and a suitable screen and in such relation to each other and to said moving film as to bend said light beam with a greater angle of incidence between the beam and the deflectors of one series, than between said beam and the deflectors of the other series, and moving both series of deflectors at relatively different speeds the ratio of which speeds is directly proportionate to the degree to which the greater angle of incidence of the light beam exceeds the lesser angle of incidence of said beam.

29. The method of projecting pictures from an uninterruptedly moving standard film and maintaining constant focal length, which consists in arranging two series of deflectors for continuous movement through the zone of projection of a light beam passing between the film and an objective lens and in such relation to each other and to said moving film as to bend said light beam with a greater angle of incidence between the beam and the deflectors of one series than between said beam and the deflectors of the other series, moving both series of deflectors at relatively different speeds the ratio of which speeds is directly proportionate to the degree to which the greater angle of incidence of the light beam exceeds the lesser angle of incidence of said beam, and moving the film at a speed determined by the relative operating speeds of the two series of deflectors.

30. In a moving picture machine, means for continuously moving a standard moving-picture film, light deflecting elements for deflecting light rays between said film and a suitable screen and means for effecting coordinating movements between said film, and light deflecting elements to maintain light paths of constant length between the screen and the successive pictures of a continuously moving film in which the pictures are separated from each other by little or no intervening space.

31. In a moving picture machine, means for continuously moving a standard motion picture film, a lens for focusing an image in a beam of light with respect to said film by means of two series of cooperating light deflecting elements, each of which series of deflecting elements is mounted for continuous movement along a closed circuit, means for moving each series of light deflecting elements along its endless path of movement to bring the deflectors into and out of cooperative relation, during which cooperative relation the lengths of the optical paths of the light rays passing between said film and lens by way of both series of deflecting elements are maintained constant.

32. In a moving picture machine, means for continuously moving a moving picture film, and cooperating series of light deflecting elements by means of which a beam of light passes between a standard moving picture film driven by said moving means and a suitable screen, the light deflecting elements in one series being mounted for continuous movement along a closed circuit and disposed with respect to the light deflecting elements in the other series which are also mounted for continuous movement along a closed circuit for maintaining a constant length of optical paths between said film, and screen, and means for moving each series of deflecting elements along continuous paths whereby continuously projected images of the film may be produced upon the screen.

33. A moving picture machine comprising means for continuously moving a standard moving picture film, a lens, and light deflecting elements mounted for continuous movement along closed circuits and moving in cooperating series into and out of positions for deflecting light rays passing between said lens and each successive picture space on said film, the light deflecting elements of one series being suitably disposed with respect to the light deflecting elements of the other series to maintain a constant length of optical paths between said lens and film, and means for moving each series of deflecting elements along its endless path of movement, whereby continuously projected images of the film may be produced upon a screen.

34. The combination with a lens, a film so positioned that a plane perpendicular to it and passing through its longitudinal medial line will include the axis of the lens and said film being guided for movement in a direction oblique to the axis of the lens, means for projecting a beam of light through the film, and two series of movable deflectors operating at different speeds relative to one another, one of which series deflects the transmitted beam after its passage through the film on to the deflectors of the other series, which, in turn, direct said beam through the lens.

35. The method of producing motion pictures which consists in causing a standard motion picture film to travel at a constant speed, projecting a beam of light through said film in a continuous manner and bending the transmitted beam twice before passing it to a screen through the employment of two series of deflectors, causing the deflectors of each series to travel along endless paths at constant speeds to bring the deflectors of each series successively into cooperative relation to act upon the transmitted beam for the purpose of bending the same with an angle of incidence on the deflectors of one series twice as large as the angle of incidence in the cooperating deflectors of the other series.

36. The method of producing motion pictures which consists in causing a motion picture film to travel at a constant speed, projecting a beam of light through said film in a constant manner, directing the transmitted beam upon one or more of a series of deflectors movable at a constant speed along an endless path, employing said deflectors to deflect the beam with a predetermined angle of incidence upon a second series of deflectors movable at a constant speed and so disposed that the angle of incidence of the second series will be one-half the angle of incidence of the first series, and employing said second series of deflectors to deflect the beam in the direction of the objective, whereby continuously projected images of the film may be produced upon the screen.

37. In a motion picture machine, a lens, a film mounted to travel along a path the axis of which will cause the film to travel with its medial line in a plane including the axis of the lens, means for driving the film uninterruptedly and at a uniform speed, means for projecting a beam of light through the film, a series of primary deflectors, each of which is substantially perpendicular to and extends through said plane at all times, means for moving said deflectors at a uniform speed successively across the path of the projected beam to cause deflection of said beam, a series of secondary deflectors, and means for causing the deflectors of the secondary series to successively pass through the path of the deflected beam at a uniform speed, different from the speed of the primary series, to further deflect said beam and pass it through the lens.

38. The method of producing motion pictures which consists in causing a motion picture film to travel continuously projecting, a beam of light through said film in a continuous manner, directing the transmitted beam upon one or more of a series of deflectors moving continuously along an endless path in a direction parallel to a plane including substantially the medial line of the film and the axis of the objective, employing said deflectors to deflect the beam with a predetermined angle of incidence upon a second series of moving deflectors so disposed that the angle of incidence of the beam on the deflectors of the second series will be substantially twice the angle of incidence which the beam makes with the deflectors of the first series, and employing a second series of deflectors to deflect the beam in the direction of the objective whereby continuously projected images of the film may be produced upon a screen.

39. The combination of a lens, a film, and a plurality of series of movable deflectors for bending a beam of light passing between the lens and film, the deflectors of each series being mounted for continuous movement along an endless path and being so inclined that the beam will have an angle of incidence with the deflectors of one series approximately twice as large as the angle of incidence which said beam has with another series.

40. The combination of a lens, a film, and a plurality of series of movable deflectors for bending a beam of light passing between the lens and film, the deflectors of each series being so inclined that the beam will have an angle of incidence with the deflectors of one series approximately twice as large as the angle of incidence which said beam has with the deflectors of another series.

41. The combination of a lens, a film, two series of movable deflectors for bending a beam of light passing between the lens and film, the deflectors of each of which series are mounted for continuous movement along an endless path and are so inclined that the beam will have an angle of incidence with the deflectors of one series approximately twice as large as the angle of incidence which said beam has with the deflectors of the other series.

42. The method which consists in projecting a beam of light uninterruptedly through a constantly moving film, thereafter bending said beam twice before passing it through the objective and maintaining the angle of one change in direction of the beam substantially equal to twice the angle of the other change in direction of the beam.

43. The combination of a lens, two series of deflectors mounted to travel along lines of direction of movement occupying a plane including the principal axis of the lens, a film mounted to travel in a plane substantially perpendicular to the direction of movement of one of said series of deflectors, means for projecting a beam of light through the film on to the deflectors of both series in succession and thence through the lens, and means for simultaneously driving both series of deflectors and the film at different speeds from one another.

44. A moving picture machine comprising means for continuously moving a standard moving picture film, a lens, and light deflecting elements mounted for continuous movement along closed circuits and moving in cooperating series into and out of positions for deflecting light rays passing between said lens and each sucessive picture space on the film, the light deflecting elements of one series being suitably disposed with respect to the light deflecting elements of the other series to maintain a constant length of optical paths between said lens and film, and means for moving each series of deflecting elements along its endless path of movement at a speed different from the speed of the other series of deflecting elements and different from the speed of the film, whereby continuously projected images of the film may be produced on a screen.

45. In a machine for consecutively projecting the juxtaposed images of a standard motion picture film, the combination with an objective lens, means for guiding the film between said lens and a source of light with the longitudinal medial line of the film disposed approximately in a plane which includes the principal axis of the lens, means for uninterruptedly moving said film, and cooperating deflectors arranged between the lens and film for bending the light beam a plurality of times with the angle between each incident ray and the corresponding reflected ray less than 90 degrees, while maintaining a constant focal length.

46. In an optical machine capable of projecting consecutive images of a standard motion picture film, the combination of an objective, a film gate, means for successively moving the film past the film gate at a suitable speed with its longitudinal medial line parallel to and substantially occupying a plane which includes the principal axis of the objective, a plurality of series of deflectors for bending a beam of light passing between the film and the objective while maintaining a constant focal length, and means for moving said deflectors into and out of cooperation with said beam in paths parallel to said plane, with the deflectors of each series moving at a different speed than the speed of the film and the speed of the deflectors of the other series.

47. In a moving picture machine, the combination of a lens, two series of deflectors mounted to travel at different speeds along lines of direction of movement in a plane which includes the principal axis of the lens, a film mounted to travel at a speed different from the speed of either series of deflectors with the longitudinal medial line of the film also substantially coincident with said plane, and means for driving the film and both series of deflectors at the different relative speeds specified.

48. The method of producing motion pictures which consists in moving a film along a path wherein the medial line of the film and the axis of the lens will lie in a common plane and with the direction of movement of the film in angular relation to the axis of the lens, passing a beam of light through the film and thence to the lens and bending such beam of light twice by reflection, by means of two distinct series of reflectors, after it leaves the film and before it reaches the lens and moving the reflectors of each series constantly along an endless path.

49. The combination with a lens, a film so positioned that a plane perpendicular to it and passing through its longitudinal medial line will include the axis of the lens and said film being mounted for movement in a direction oblique to the axis of the lens, means for projecting a beam of light through a film, and deflectors moving continuously along endless paths for bending the transmitted beam of light after it has passed through the film and before it reaches the lens.

50. The method of producing motion pictures which consists in causing a motion picture film to travel in a continuous manner, projecting a beam of light through said film in a constant manner, directing the transmitted beam upon one or more of a series of deflectors moving at a constant speed along a continuous path in a direction parallel to a plane including substantially the medial line of the film, and the axis of the objective, employing said deflectors to deflect the beam with a predetermined angle of incidence upon a second series of moving deflectors positioned to receive such beam and so disposed that the angle of incidence of the first series will be substantially one half the angle of incidence of the second series, and employing the second series of deflectors to deflect the beam in the direction of the objective, whereby continuously projected images of the film may be produced upon a screen.

51. The method of producing motion pictures which consists in causing a motion picture film to travel at a constant speed, projecting a beam of light through said film in a constant manner, directing the transmitted beam upon one or more of a series of deflectors moving at a constant speed along a continuous path in a direction parallel to a plane including substantially the medial line of the film and a source of light and the axis of the objective, employing said deflectors to deflect the beam with a predetermined angle of incidence upon a second series of deflectors movable at a constant speed and so disposed that the angle of incidence of the first series will be substantially one half the angle of incidence of the second series, and employing the second series of deflectors to deflect the beam in the direction of the objective, whereby continuously projected images of the film may be produced upon a screen.

52. The method of producing motion pictures which consists in causing a motion picture film to travel in a continuous manner, projecting a beam of light through said film in a continuous manner, directing the transmitted beam upon one or more of a series of deflectors moving continuously along a continuous path in a direction parallel to a plane including substantially the medial line of the film, and the axis of the objective, employing said deflectors to deflect the beam with a predetermined angle of incidence upon a second series of movable deflectors so disposed that the angle of incidence of the first series will be substantially one half the angle of incidence of the second series, and employing the second series of deflectors to deflect the beam in the direction of the objective, whereby continuously projected images of the film may be produced upon a screen.

53. The method of producing motion pictures which consists in causing a motion picture film to travel at a constant speed, projecting a beam of light through said film in a constant manner, directing the transmitted beam upon one or more of a series of deflectors moving continuously along a continuous path in a direction parallel to a plane including substantially the medial line of the film and a source of light and the axis of the objective, employing said deflectors to deflect the beam and a predetermined angle of incidence upon a second series of deflectors movable continuously and in such direction that the angle of incidence of the first series will be substantially one half the angle of incidence of the second series, and employing the second series of deflectors to deflect the beam in the direction of the objective, whereby continuously projected images of the film may be produced upon a screen.

54. Means for optically rectifying the movement of the beam of light comprising cooperating series of deflectors arranged to successively bend the beam a plurality of times with the angle between each incident ray and the corresponding reflected ray less than 90 degrees while maintaining a constant focal length.

55. Means for optically rectifying the movement of a beam of light comprising two series of movable deflectors for bending the beam twice, the deflectors of each series being so inclined that the beam will have an angle of incidence with the deflectors of one series approximately twice as large as the angle of incidence which said beam has with the deflectors of the other series.

56. Means for optically rectifying the movement of a beam of light comprising two series of movable deflectors for bending a beam of light twice in succession, the deflectors of each of which series are mounted for continuous movement along an endless path and are so inclined that the beam will have an angle of incidence with the deflectors of one series approximately twice as large as the angle of incidence which said beam has with the deflectors of the other series.

57. The herein described method of optically rectifying the movement of a beam of light which consists in arranging two series of deflectors for continuous movement through the zone of projection of the light beam and in such relation to each other as to bend said light beam with a greater angle of incidence between the beam and the deflectors of one series than between said beam and the deflectors of the other series, and moving both of said deflectors at relatively different speeds, the ratio of which speeds is directly proportionate to the degree to which the greater angle of incidence of the light beam exceeds the lesser angle of incidence of said beam.

58. The herein described method of optically rectifying the movement of a beam of light which consists in bending a light beam twice, and maintaining the angle of one change in direction of the beam substantially equal to twice the angle of the other change in direction of the beam.

In testimony whereof I have signed the foregoing specification.

WILHO A. KOSKEN.